C. VAN BRUNT.
APPARATUS FOR MEASURING CARBON DIOXIDE IN GASEOUS MIXTURES.
APPLICATION FILED JULY 12, 1921.

1,436,219.

Patented Nov. 21, 1922.

Inventor:
Charles Van Brunt,
by
His Attorney

Patented Nov. 21, 1922.

1,436,219

UNITED STATES PATENT OFFICE.

CHARLES VAN BRUNT, OF SCHENECTADY, NEW YORK, ASSIGNOR TO GENERAL ELECTRIC COMPANY, A CORPORATION OF NEW YORK.

APPARATUS FOR MEASURING CARBON DIOXIDE IN GASEOUS MIXTURES.

Application filed July 12, 1921. Serial No. 484,265.

*To all whom it may concern:*

Be it known that I, CHARLES VAN BRUNT, a citizen of the United States, residing at Schenectady, county of Schenectady, State of New York, have invented certain new and useful Improvements in Apparatus for Measuring Carbon Dioxide in Gaseous Mixtures, of which the following is a specification.

The present invention relates to instruments for measuring the amount of carbon dioxide gas in gas mixtures. The principal application of such instruments is in connection with boilers for measuring the $CO_2$ in flue gases, the percentage of $CO_2$ being indicative of the efficiency of the combustion, and in the following description my invention is specifically described as applied to this use. It will be understood, however, that the invention is not necessarily limited to this use.

For a consideration of what I believe to be novel and my invention, attention is directed to the accompanying description and the claims appended thereto.

Figure 1:
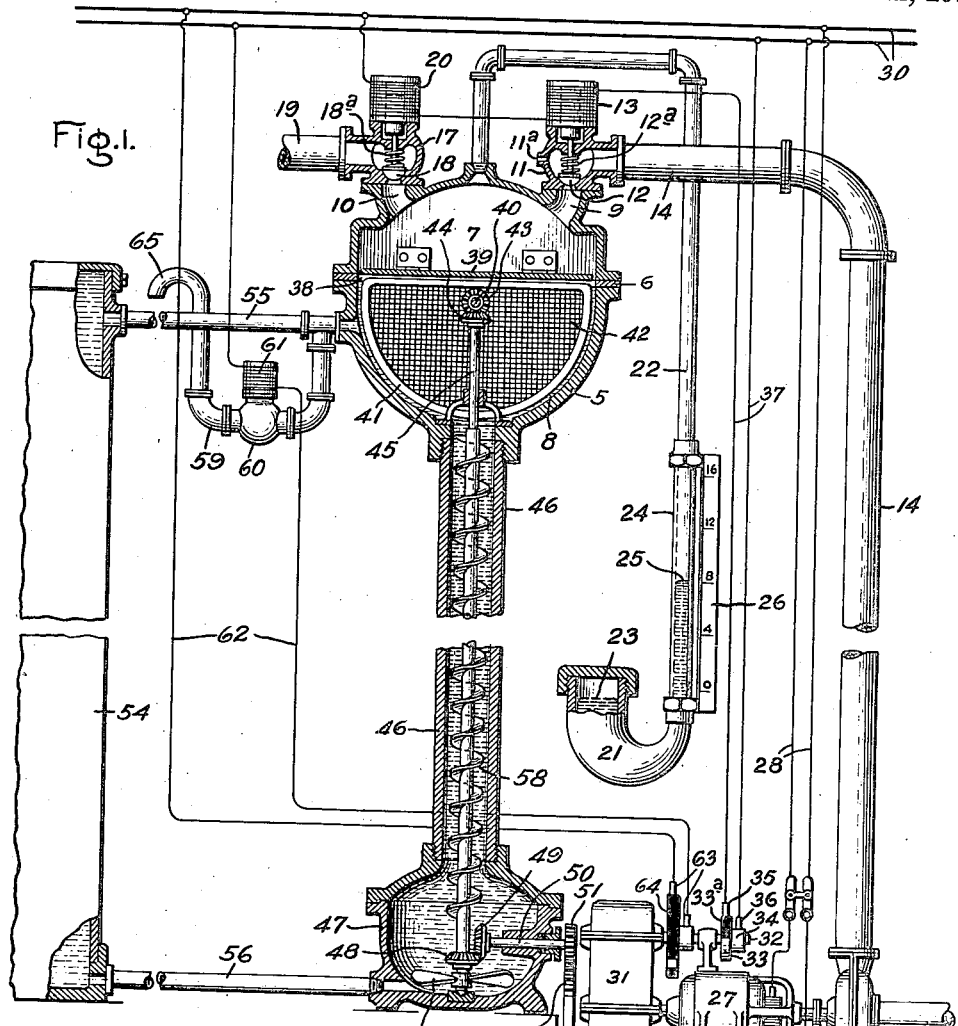
Figure 2:
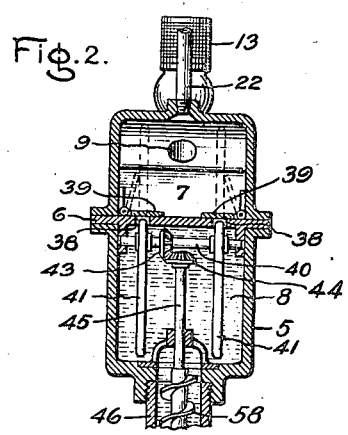
Figure 3:
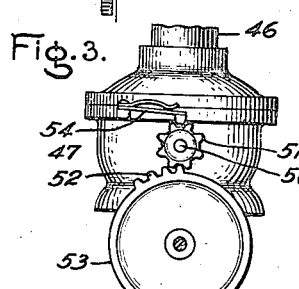

In the drawing, Fig. 1 is a diagrammatic view, partly in section, of an apparatus embodying my invention: Fig. 2 is a transverse sectional view through the absorption chamber and reagent holding chamber, and Fig. 3 is a detail of certain parts.

In carrying out my invention, I provide an absorption chamber and a reagent chamber. These chambers may be both in the same casing separated from each other by a partition plate, or they may be in separate casings. Associated with the absorption chamber is means for introducing into it at intervals a sample of gas to be analyzed. For this purpose, I preferably provide admission and discharge conduits connected to the absorption chamber and provided with electrically operated valves controlled by a circuit closer, the arrangement being such that the valves are opened during a predetermined interval for the scavenging of the old gas sample and the admission of a new one, after which they are closed during a predetermined interval for the absorption of the $CO_2$ contained in the gas. The absorption of $CO_2$ is effected by the introduction into the absorption chamber of reagent from the reagent chamber, the reagent being introduced during the absorption interval, i. e., while the valves are closed. The reagent may be introduced from the reagent chamber into the absorption chamber in various ways, an important consideration being that a sufficient amount be introduced and that it be sufficiently well distributed to effect the absorption in a desired length of time and that after the absorption is completed the reagent be withdrawn so there will be no pre-absorption during the introduction of the next gas sample. A preferred arrangement for introducing and withdrawing the reagent is described hereinafter in connection with the drawing. The amount of $CO_2$ in the gas is measured by measuring the pressure in the absorption chamber by means of a suitable manometer which may be permanently connected to the absorption chamber or connected thereto only during an interval at the end of the absorption period. The sequence of operation is as follows: first, the admission of a sample of gas to the absorption chamber; second, the introduction of the absorption reagent from the reagent chamber to the absorption chamber; third, the removal of the reagent, and fourth, the scavenging of the absorption chamber of the old sample and the introduction of a new one. The arrangement is such that these operations are carried on continuously and the reading of the manometer at the close of any absorption period indicates the $CO_2$ present in the gas sample.

Referring to the drawing, 5 indicates a casing which is divided by a partition plate 6, into an absorption chamber 7 and a reagent containing chamber 8. In the wall of chamber 7 is an inlet opening 9 and a discharge opening 10. Connected to inlet opening 9 is the discharge side of a valve casing 11 in which is a valve 12 normally held seated by a spring 12ª and adapted to be opened by a solenoid 13, the core of which is connected to the stem of valve 12. Connected to the inlet opening of valve casing 11 is a pipe 14 which leads from the discharge side of a suitable pump 15. The suction side of pump 15 is connected by a pipe 16 to a source from which the sample to be analyzed is to be taken, for example, the stack of a boiler. Connected to discharge opening 10 is a valve casing 17 containing a valve 18 normally held seated by a spring 18ª. The discharge opening of the valve casing is connected to a waste pipe 19 which may lead to any suitable point. Valve 18 is adapted to be opened by a solenoid 20, the core of which is connected to the stem of valve 18.

At 21 is a U-tube manometer, one leg of which is connected by a pipe 22 to absorption chamber 7. In the manometer is a suitable indicating liquid 23. The leg of the manometer which is connected to chamber 7 has a glass section 24 through which the meniscus 25 of the indicating liquid may be seen, and associated with section 24 is a scale plate 26 having a suitable scale marked thereon.

Pump 15 is driven by an electric motor 27 connected by lead wires 28 to a source of electrical energy 30. Motor 27 through suitable speed reduction gearing contained in casing 31, drives a shaft 32 on which is a circuit closing device comprising two metallic disks 33 and 34 adapted to periodically connect together two brush contacts 35 and 36. Any suitable arrangement of circuit closing device may be used. As shown, disks 33 and 34 are insulated from shaft 32, but are electrically connected to each other, and disk 33 carries an insert of insulating material on its periphery as indicated at 33$^a$. When contact 35 rests on insulation 33$^a$, the circuit is open and when it is off such insulation the circuit will be closed. Contacts 35 and 36 are connected by lead wires 37 to source of electrical energy 30, the two solenoids 13 and 20 being connected in series in the circuit. Valves 12 and 18 are biased to closed positions by springs 12$^a$ and 18$^a$ as shown and are periodically opened by the circuit closing device closing the circuit through lead wires 37. When valves 12 and 18 are open pump 15 can force a charge of gas through the absorption chamber 7 while when such valves are closed, the chamber is sealed.

In partition 6 are two transversely extending slots 38 covered by upwardly opening hinged doors 39. Doors 39 are biased by their weight or by their weight assisted by suitable spring means, to positions where they cover slots 38. Pivoted in the walls of reagent chamber 5 is a shaft 40 on which are fixed two frames 41 which carry one or more screens 42 of suitable mesh. The frames 41 with screens 42 thereon, are adapted to move up through slots 38 into the absorption chamber as indicated in dotted lines in Fig. 2. On shaft 40 is a bevel gear wheel 43 which meshes with a bevel gear wheel 44 on the upper end of a driving shaft 45. Driving shaft 45 projects downwardly through a tube 46 fastened to the lower side of reagent chamber 8, the lower end of the tube connecting to a casing 47. On the lower end of shaft 45 is a bevel gear wheel 48 with which meshes a bevel gear wheel 49 on the inner end of a shaft 50 journaled in a side wall of casing 47. On the outer end of shaft 50 is a pinion 51 adapted to mesh with teeth 52 on the periphery of a mutilated gear wheel 53. Mutilated gear wheel 53 is driven from motor 27 through suitable gearing contained in the lower half of casing 31. Engaging with the teeth of pinion 51 is a spring-pressed pawl 54 which holds pinion 51 against movement except when it is turned positively by the teeth on mutilated gear 53. The arrangement is such that the teeth on mutilated gear 53 when passed once in engagement with pinion 51 give a one-half revolution to shaft 40 which carries the frames 41. This means that on one revolution of gear wheel 53 frames 41 will be moved from the reagent chamber into the absorption chamber and upon a second revolution thereof, will be moved from the absorption chamber back to the reagent chamber.

54 is an air-tight or sealed tank containing a supply of reagent. At its upper end it is connected by a pipe 55 to reagent chamber 8 and at its lower end is connected by a pipe 56 to the bottom of casing 47. On the lower end of shaft 45 are mixing or stirring paddles 57 and on the shaft is a continuous screw 58. These serve to stir the reagent and set it in circulation through reagent chamber 8. Connected to pipe 55 is a U-shaped pipe 59 containing a normally closed valve 60 adapted to be opened by a solenoid 61. Solenoid 61 is connected to source of electrical energy 30 by circuit wires 62 which lead to contacts 63 of a circuit closer 64. Circuit closer 64 is carried by the shaft 32 which is driven from motor 27 and is adapted to periodically close the circuit on solenoid 61, thereby opening valve 60. Circuit closer 64 is of the same general type as that which closes the circuit on solenoids 13 and 20 and is arranged to open valve 60 for a short period during each revolution of shaft 32. Pipe 59 at its outer end terminates in a curved neck 65 and serves to define the liquid height in reagent chamber 8 and maintain the liquid level in the chamber at the correct height. Due to the absorption, the volume of the solution in chamber 8 tends to slowly increase. The periodical opening of valve 60 permits the excess reagent to escape through the pipe 59 thereby maintaining the correct level in the reagent chamber. In other words, the pipe 59 forms an overflow pipe which is opened at intervals to permit of the escape of any excess reagent in the absorption chamber. It will be understood that the highest point of pipe 59 is equal to the level which it is desired to maintain in chamber 8.

As a reagent I may use any suitable solution such as, for example, a solution of KOH, NaOH, or milk of lime, containing a small percentage of one of these. The operation is as follows:

The circuit on motor 27 being closed, the motor continuously operates pump 15, the circuit closers on shaft 32, and mutilated gear wheel 53. During the first part of the cycle, the circuit containing solenoids 13 and 20 is closed by the circuit closer comprising disks 33 and 34 thereby opening valves 12 and 18. Pump 15 then forces a sample of the gas to be analyzed into absorption chamber 7, at the same time forcing the old sample out. Pump 15 is running continuously and draws gas through pipe 16, discharging it to pipe 14. Valve casing 11 may be provided with an opening $11^a$ for the discharge of gas so a continuous circulation is kept up, the opening being of such size that some pressure will always exist in the valve casing. This assures that a sample fresh from the source of supply will be obtained. The circuit closer holds valves 12 and 18 open a length of time sufficient for the scavenging of the old sample and the introduction of a new one after which the valves close, trapping the new sample in the absorption chamber. The teeth on mutilated gear wheel 53 now engage pinion 51 turning shaft 45 which in turn turns shaft 40 to bring frames 41 up through slots 38 into absorption chamber 7. The wire mesh on frames 41 carries reagent into chamber 7. The gear teeth 52 are sufficient in number to bring the frames to the desired position in the absorption chamber and they stand there until teeth 52 again reach pinion 51, when the frames will be turned back again into the reagent chamber. During the period the frames stand in absorption chamber 7, the $CO_2$ in the gas sample is absorbed by the reagent creating a vacuum in chamber 7 which is indicated by manometer 21. Scale 26 may be calibrated to read directly percentage of $CO_2$. If found desirable, the arrangement may be such that the frames 41 are elevated into the absorption chamber a plurality of times during the absorption period so as to bring fresh supplies of reagent into the chamber. At the end of the absorption period the circuit is closed on solenoids 13 and 20, which open valves 12 and 18 whereupon the absorption chamber is scavenged of the old sample, a new one taking its place. The cycle of operation is then repeated.

It will be noted that during the scavenging period, no reagent is present in the absorption chamber so there can be no pre-absorption of $CO_2$ during the time the sample is being taken. This insures that a true sample is trapped in the absorption chamber.

The tube 46 is sufficiently long that the liquid column will provide a pressure in casing 47 which is greater than atmospheric pressure even when the lowest pressure exists in chamber 7. This means that any leakage at casing 47 will be of liquid leaking out and not air leaking in. As a result there is no danger of the accuracy of the instrument being impaired by leakage of air into the absorption chamber. The paddles 57 and screw 58 may or may not be used as found desirable. Their use will depend primarily upon the character of the reagent. For example, when lime solution is used a stirring or mixing means is generally desirable. With certain reagents, the absorption of $CO_2$ increases their specific gravity and in such cases there will be more or less circulation set up automatically.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by other means.

What I claim as new and desire to secure by Letters Patent of the United States, is:—

1. In an apparatus of the character described, the combination of an absorption chamber, a reagent chamber, a reagent supply tank, means for introducing a gas sample to be analyzed into the absorption chamber, means for carrying reagent from the reagent chamber into and out of the absorption chamber, and means for producing a circulation of reagent between the reagent supply tank and the reagent chamber.

2. In an apparatus of the character described, the combination of an absorption chamber, a reagent chamber, a reagent supply tank, means for controlling the introduction of a gas sample to be analyzed into the absorption chamber, means for carrying reagent from the reagent chamber into and out of contact with the gas sample in the absorption chamber, and means between the reagent supply tank and the reagent chamber for producing a circulation of reagent between them.

3. In an apparatus of the character described, the combination of an absorption chamber, a reagent chamber adjacent thereto, a reagent supply tank connected with the reagent chamber, means for introducing a sample of gas to be analyzed into the absorption chamber, means for trapping said sample within said absorption chamber, means for carrying reagent from the reagent chamber into the absorption chamber and into contact with the gas sample only, said last-named means being of large area and small volume, and means for defining the liquid level in the reagent chamber.

4. In an apparatus of the character described, the combination of an absorption chamber, a reagent chamber adjacent thereto, a hermetically sealed reagent supply tank, conduits connecting the reagent supply tank and the reagent chamber through which a circulation of the reagent may be maintained between them, means for forcing a gas to be analyzed through the absorption chamber, valves for periodically trapping a sample of said gas within the absorption chamber, and rotating means for carrying reagent into contact with the gas sample trapped within the absorption chamber, said last-named means exposing a large area of reagent to the gas sample while being of small volumetric displacement.

5. In a gas analyzing apparatus of the character described, the combination with a casing containing a gas absorption chamber and a reagent containing chamber adjacent thereto, of an air-tight reagent supply tank, reagent circulating means connecting the reagent supply tank with the reagent chamber, means for forcing a stream of the gas to be analyzed through the gas absorption chamber, means for periodically trapping a sample of said gas in the gas absorption chamber, means pivoted in said casing for periodically carrying reagent from the reagent chamber into and out of contact with the gas sample trapped within the gas absorption chamber whereby a portion of said gas sample is absorbed by the reagent, and means connected with the absorption chamber wherewith the amount of gas absorption is indicated.

6. In an apparatus of the character described, the combination of a casing, a wall dividing it into an absorption chamber and a reagent chamber, said wall having an opening, reagent carrying means pivoted in said reagent chamber, and means for moving said reagent carrying means through the opening into the absorption chamber and returning it again to the reagent chamber.

7. In an apparatus of the character described, the combination of an absorption chamber having an inlet port and an exhaust port, valves controlling said ports, means for periodically opening said valves to introduce a sample of gas to be analyzed, and a multiplicity of reagent carrying screen plates pivoted to rotate into and out of the absorption chamber during the period the valves are closed 8. In an apparatus of the character described, the combination of a casing, a wall dividing it into an absorption chamber and a reagent chamber, means for supplying gas samples to the absorption chamber, means for supplying reagent to the reagent chamber and effecting a circulation through it, a shaft pivoted in the reagent chamber having its axis in a plane parallel to the dividing wall, a multiplicity of screen disks mounted on said shaft in spaced and parallel relation to each other, and means for rotating said shaft about its axis whereby the screens are carried through the reagent chamber to pick up a film of reagent and then through the absorption chamber to absorb the gas.

9. In an apparatus of the character described, the combination of a casing, a wall dividing it into an absorption chamber and a reagent chamber, means for supplying gas samples to the absorption chamber, means comprising a multiplicity of rotating screen disks pivoted in said casing for carrying reagent from the reagent chamber to the absorption chamber, and returning said reagent to the reagent chamber and a motor for actuating both said means in sequence.

10. In an apparatus of the character described, the combination of a casing, a partition dividing it into an absorption chamber and a reagent chamber, a vertical tube connected to the reagent chamber, a reagent supply tank, and pipes connecting it to the reagent chamber and to the lower end of said tube.

11. In an apparatus of the character described, the combination of a casing, a partition dividing it into an absorption chamber and a reagent chamber, a vertical tube connected to the reagent chamber, a shaft in said tube, reagent carrying means actuated from the upper end of said shaft, and means mounted in a wall of said tube at its lower end for actuating said shaft.

12. In an apparatus of the character described, a gas absorption chamber, a reagent dispensing chamber adjacent thereto, means for supplying gas to be analyzed to the absorption chamber, means for carrying reagent from the reagent chamber into and out of the absorption chamber, a reagent supply tank, a conduit connecting it at one end to the reagent chamber, a reagent pumping means, a conduit connecting it to the other end of said reagent supply tank, a conduit connecting said reagent pumping means with the reagent chamber, and motor driven gearing for actuating the above-named means in proper sequence.

13. In an apparatus of the character described, the combination of a gas absorption chamber, a reagent dispensing chamber, a wall dividing said chambers having openings connecting them, a multiplicity of flat semi-circular wire-mesh screens mounted in spaced parallel relation to each other in said reagent chamber, a shaft carrying said screens, means for rotating said shaft whereby said screens will be carried about it as an axis from the reagent chamber through the dividing wall openings into the absorption chamber and back through said openings into the reagent chamber, means for closing the dividing wall openings when said screens are in the reagent chamber, and means for periodically effecting said operation in proper sequence and at the proper speed.

14. In an apparatus of the character described, the combination of a casing, a wall dividing it into a gas absorption chamber and a reagent chamber, said wall having openings connecting said chambers, a vertical tube connected with the reagent chamber, a reagent circulating device within said tube, a shaft for driving said device passing axially through said tube, means for rotating said shaft connected to it at its lower end, a multiplicity of parallel reagent carrying screens in contact with the reagent in the reagent chamber, a pivot shaft for said screens on which they are secured in spaced relation to each other, means for rotating said pivot shaft whereby the reagent carrying screens will be carried from the reagent chamber through the openings in the dividing wall into contact with the gas in the absorption chamber and back into the reagent in the reagent chamber, and means for closing the dividing wall openings when said screens are in the reagent chamber.

In witness whereof, I have hereunto set my hand this 8th day of July 1921.

CHARLES VAN BRUNT.